April 15, 1941. J. LOHSE 2,238,815
APPARATUS FOR THE DIRECT RECOVERY FROM ORES OF HEAVY
METALS OF THE NONFERROUS GROUP
Original Filed Sept. 14, 1939
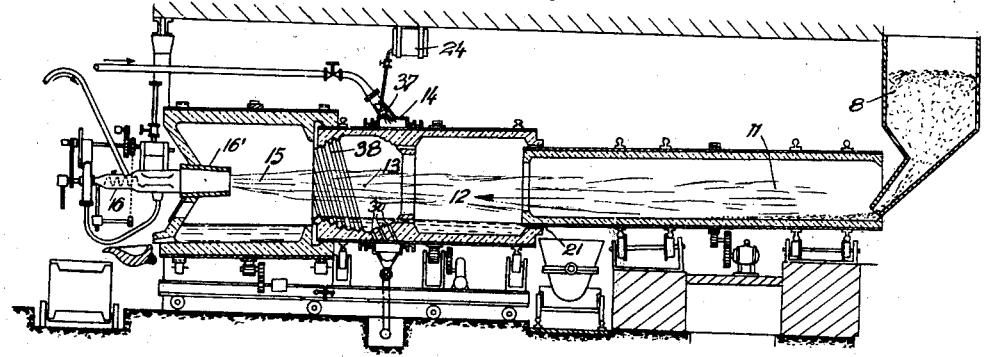
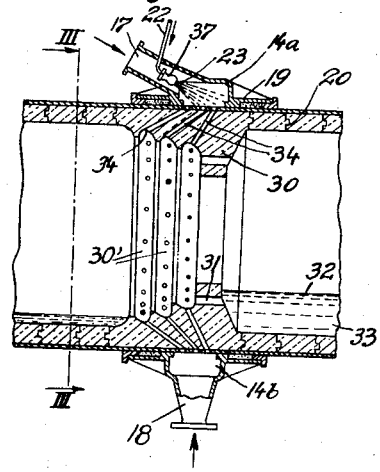 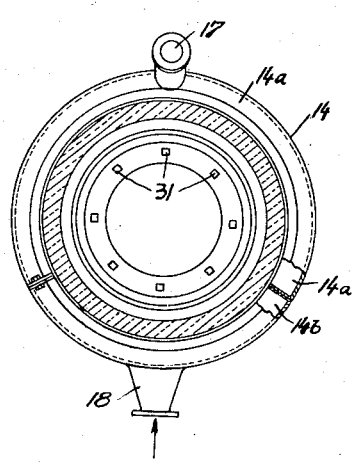
Inventor:
Julius Lohse
By Watson E. Coleman
Attorney Patented Apr. 15, 1941

2,238,815

UNITED STATES PATENT OFFICE 2,238,815

APPARATUS FOR THE DIRECT RECOVERY FROM ORES OF HEAVY METALS OF THE NONFERROUS GROUP

Julius Lohse, Berlin, Germany

Original application September 14, 1939, Serial No. 294,942. Divided and this application October 15, 1940, Serial No. 361,315. In Germany August 17, 1931

4 Claims. (Cl. 266—36)

This invention pertains to the class of metallurgy and more particularly to improvements in apparatus designed to facilitate the direct recovery of metals, particularly nonferrous metals, from their ores.

The present application constitutes a division of my copending application Serial No. 294,942, filed September 14, 1939, which application constitutes a continuation in part of my copending application, Serial No. 182,110, filed December 28, 1937, now patent 2,223,569, granted Dec. 3, 1940.

The present invention has to do with apparatus in which present day chemical-metallurgical processes for the recovery of nonferrous metals such as copper and the like, from their ores, can be carried out with maximum utilization of heat and in continuous operation in the treatment of the metal from the crude ore stage up to the finished metal and a particular object of the invention herein disclosed is to provide in a furnace structure designed for the carrying out of the stated process, an improved form of converter by means of which the Bessemerizing step may be more efficiently carried out and wherein the maintenance of proper temperatures may be more easily accomplished and the formation of copper oxide in the copper bath prevented.

Another object of the invention is to provide a converter rotary shaft furnace drum having associated therewith a circumferentially extending manifold which is constructed and arranged to facilitate the introduction of air under pressure through the molten metal in the drum in a substantially radial direction and from beneath the metal and to introduce into the drum above the level of the molten metal a mixture of oil and air which is ignited and creates a high temperature above the bath for the purpose of preventing the metal charge from being blown cold.

The invention is illustrated by way of example in the accompanying drawing, wherein:

Figure 1 illustrates a longitudinal section of a portion of my rotary furnace system which comprises a heating chamber, settler, refining drum and the converter structure forming the subject-matter of the present application.

Figure 2 is a longitudinal sectional view through the middle portion of the converter structure.

Figure 3 is a transverse sectional view of the converter structure taken on the line 3—3 of Figure 2.

Referring now more particularly to the drawing, there is illustrated a series of cylindrical bodies which are interengaged telescopically or in stuffing-box fashion and each of which is preferably furnished with a separate drive and is capable of being moved out separately for the purpose of repairs and overhauling. This group of cylindrical bodies or furnace cylinders comprises a portion of my complete rotary furnace system as disclosed in my original application and consists of a final roasting and preheating chamber 11, a settler 12, the converter constituting the subject-matter of the present application, indicated generally by the numeral 13, and an end or terminal refining drum 15.

The numeral 8 designates a bunker which receives the roasted ore and other material from the preliminary roasting chamber, not shown, and conducts the same into the preheating chamber 11, in the manner illustrated.

At the opposite end of the series of cylinders or drums is a burner 16 having a nozzle 16' which extends into the drum 15 axially thereof so as to direct a long flame therethrough in opposition to the direction of movement of the charge. This burner, while not specifically herein described, is designed to burn a mixture of liquid and solid fuels, the latter in pulverulent form, or liquid fuel alone and also to inject into the system with the flame any other desired additions, such as gases which it may be desirable to have present in the refining drum and other adjoining drums.

The flame from the burner 16 passes along the axis of the complete system through all of the rotary furnaces or drums and is drawn toward the opposite end of the system by a suitable suction fan, not shown.

In the final roasting and preheating chamber 11, the charge supplied in a hot state from the bunker 8 is finally roasted and preliminarily fused and in this fused condition it passes into the settler 12 where the slag is separated from the metal.

The settler 12 and converter 13 are in the form of a cylindrical structure, as previously stated, and are constructed to provide at the point of separation between the two chambers 12 and 13 an inwardly directed annular wall which forms a part or continuation of the lining of the furnace and which is indicated generally by the numeral 30 and illustrated in detail in Figures 2 and 3. This wall is formed upon the side toward the settler so as to have a steep face whereby an accumulation of the fused material within the settler is brought about. Upon the opposite side of the wall or the side facing the converter chamber, the wall is formed to provide a concentrically arranged series of annular terraces 30′ which are of progressively increasing diameter from the settler toward the converter. These terraces are recessed or depressed, as shown in Figure 2, to form annular channels.

The annular wall 30 is provided below the edge thereof with passages 31 which extend axially of the furnace and are designed so that the slag 32 floating upon the fused material is prevented from running out of the settler into the converter while the molten material 33 is able to pass through the passages 31 to the converter chamber by way of and over the annular terraces 30′. In flowing into the converter across the channeled annular terraces 30′, the molten material passes or flows over the orifices or tuyères 34 which open through the bottom of the terraces and which are arranged to have an outwardly convergent relation as illustrated in Figure 2. Through these tuyères a current of air is forced by means of a suitable air compressor or in any other suitable manner (not shown) for the purpose of aerating the molten metal as it passes over the annular terraces. For accomplishing the discharge of air under pressure through the tuyères or passages 34, there is provided around the settler converter unit a nonrotating manifold or bustle pipe, which is indicated generally by the numeral 14, and which is divided into two sections or parts, one of which is indicated by the numeral 14a and covers or encircles substantially two-thirds of the upper circumference of the furnace drum, while the other part or third of the bustle pipe is indicated by the numeral 14b and covers the lower third of the drum or that portion over which the molten metal lies. The bustle pipe portions 14a and 14b are provided respectively with inlet pipes or pipe connections 17 and 18 and as is clearly shown in Figure 2, the inner side of the bustle pipe is open and directed toward the drum and has the convergent ends of the tuyères or passages 34 directed thereinto. At each side of the bustle pipe is a stuffing box 19 which forms an air-tight contact with the outer side of the steel shell 20 forming a part of the wall of the drum.

The connection 17 provides means for introducing into the upper part of the manifold, a mixture of oil and air which may be discharged therefrom through the air passages 34 into the upper part of the converter drum, while the connection 18 provides means for the introduction into the lower third of the manifold of air under pressure which, as previously stated, will be discharged upwardly through the molten metal as it flows over the annular terraces 30′.

In this terraced aerating hearth there are removed the last impurities as slag. The slag and blister copper are caused to pass from the converter by the rotary movement of the same and by the provision of helical grooves 38 which are formed in the lining of the converter, into the refining drum 15 where they can be separately tapped. The refining drum may be provided with a working door for the usual assaying, poling the bath, slag skimming and the like. The rich slag removed from the refining drum may be returned to the bunker 8 for re-smelting.

The poor slag is removed from the settler chamber 12 by allowing it to flow off through the gap 21 between the preheating drum 11 and the drum 12 and is received in suitable slag trucks.

While any suitable means may be employed for introducing oil into the manifold section 14a there is here shown a pipe line 22 extending into the pipe connection 17 and terminating in a nozzle 23, this pipe line leading from a suitable reservoir for the oil, such as is indicated at 24.

By the method of introducing oil and air for combustion in the converter it is possible to prevent the formation of cuprous oxide in the copper bath, the cuprous oxide being immediately reduced to metallic copper owing to the presence of C and $H_2$ formed by the cracking of $CH_4$ and $C_2H_4$ forming the oil injected with the air. On the upper side of the copper bath the said oil gases injected with the blowing air are caused to be ignited ($CO_2$, $H_2O$, CO being formed) so that a very high temperature is obtained at this point and it is quite impossible for the copper charge to be blown cold, such as occurs frequently in the processes at present in use.

As previously stated, the blown blister copper is discharged from the converter shell by the helical firebrick lining 38 so that the copper is discharged continuously into the refining drum 15 which is sufficiently large to act as a container. Very little refining is required at this stage as the converter 13 has worked up the blister copper by treating it as a thin band while it is passing over the inclined terrace-like tuyère zone, so that all impurities are collected in a very thin liquid slag passing with the blister copper to the refining drum.

In carrying out the process of recovering metals in apparatus such as here disclosed there are four sources of heat to maintain the processes carried out continuously in the chambers 11, 12, 13 and 15, quite apart from the fact that the charge is already in a heated condition as it enters from the bunker 8, as a result of the preliminary roasting operation to which it has been subjected. The first source of heat is represented by the burner 16, which projects a long and powerfully whirling flame into the entire system of furnace drums.

The second source of heat is constituted by the burning of sulphur contained in the white and blue metal bath, pouring through the partition openings into the converter section, to be blown there instantly to a blister copper.

The third source of heat is represented by the development of calories by combustion of the cracked oil gases injected with the blowing air into the bustle pipe and through the tuyère system.

The fourth source of heat is the large surface of the refining bath 15 with tons of liquid metallic copper and the revolving firebrick lining raised to temperature by the burner 16. The surplus of heat from the combustion of sulphur and oil gases in the converter and the flame heat itself constitute the means by which the process in the drum 11 of practically dead roasting and rapid smelting of charge material rich in copper, is rendered possible, so that no poor matte, but rich blue and white metal, is formed.

I claim:

1. In an apparatus of the character set forth, a converter rotary shaft furnace drum, a nonrotating manifold encircling the drum, the said drum having Bessemerizing tuyères leading through the wall thereof to the interior and communicating with said manifold, said manifold being divided into two portions which are arranged with respect to the drum to divide the tuyères into two groups, one group lying above the level of molten metal in the drum and the other group lying below the level of the molten metal, means for introducing a mixture of oil and air from one manifold section into the group of tuyères in communication therewith, and means for introducing air under pressure into the other manifold section for introduction through the other group of tuyères in communication therewith and which discharge into the drum beneath the molten metal lying therein.

2. In a structure of the character described, a rotary drum, an annular wall dividing said drum into two chambers, said wall upon one side having a substantially straight face and upon the opposite side being formed to provide a terraced series of concentrically arranged annular troughs, the wall having a series of passages formed therethrough parallel with the drum and spaced from the edge of the wall, an air manifold encircling said drum, said drum having a series of air passages formed therethrough and disposed circumferentially thereabout and establishing communication between said manifold and the bottoms of the troughs, said manifold being partitioned to form two chambers, one manifold chamber extending around a major portion of the drum and the other chamber extending around the remaining minor portion thereof, means for introducing air into the said other chamber, and means for introducing a combustible fluid into the said one of the chambers, the air and combustible fluid being introduced into the drum through the passages adjacent to the chambers while the drum is rotating.

3. In an apparatus of the character set forth, a converter rotary shaft furnace drum, said drum having a circumferentially disposed series of passages leading through the wall thereof and generally directed toward the axial center of the drum, a nonrotating manifold pipe encircling the drum around the portion through which said passages are formed, said pipe being open on the side adjacent the drum and having the passages opening thereinto, the pipe contacting the drum and having an air-tight connection therewith, said pipe being divided into upper and lower portions, the upper portion thereof encircling substantially two-thirds of the drum and the lower portion encircling the remaining portion of the drum, those passages opening from the lower portion of the pipe through the lower portion of the drum being covered by molten metal in the drum, means for introducing air and a combustible fluid into the upper portion of the pipe, and means for introducing air under pressure into the lower portion of the pipe.

4. In an apparatus of the character set forth, a converter rotary shaft furnace drum, the said drum having a plurality of groups of air passages extending through the wall thereof and arranged circumferentially around the drum, the passages of the several groups extending through the wall of the drum oblique to the axis of the drum and diverging inwardly, said drum having the inner wall formed to provide a series of concentric annular terraces of progressively increasing diameter, the passages of each group opening through the surface of a terrace, an annular pipe encircling and having contact with the outer wall of the drum and open upon its inner side and having the open side covering the outer ends of the groups of passages, said pipe being held against rotation, said pipe being divided into an upper portion extending around substantially the upper two-thirds of the drum and a lower portion extending through the remaining lower third of the drum, means for introducing air and a combustible fluid under pressure into the upper portion of the pipe, and means for introducing air under pressure into the lower portion of the pipe.

JULIUS LOHSE.